April 30, 1968  TAKAO KAWABE  3,381,198
STARTER FOR ALTERNATING CURRENT DRIVEN MOTORS
Filed March 29, 1965  4 Sheets-Sheet 1

Takao Kawabe,
INVENTOR

BY Wenderoth,
Lind and Ponack, attys

United States Patent Office 3,381,198
Patented Apr. 30, 1968

3,381,198
STARTER FOR ALTERNATING CURRENT DRIVEN MOTORS
Takao Kawabe, 41–5 2-chome, Higashi-Ogu, Arakawa-ku, Tokyo, Japan
Filed Mar. 29, 1965, Ser. No. 443,543
10 Claims. (Cl. 318—229)

ABSTRACT OF THE DISCLOSURE

A starter circuit for an AC motor, consisting essentially of a core for forming a magnetic path, a main circuit winding on said core for controlling the inrush of current to the motor on starting, a compensating winding circuit having a winding on said core and having the turns wound so as to produce a flux in the core opposed to the flux of the main current winding, switching means in said compensating winding circuit for keeping the compensating winding circuit open on starting the motor so that the self-reactance of the main circuit winding suppresses the inrush of current and for closing the compensating winding circuit so that said compensating winding circuit generates a flux in the magnetic circuit of the core opposing and substantially cancelling the flux generated by the main winding circuit.

---

This invention relates to improvements in and relating to starters for alternating current driven motors.

Generally, a full voltage starting system is known to be the most economical for the starting of AC motors. In view of the fact that AC motors characteristically require large starting currents, there have been favorably used such devices as a Stardelta starter, starter compensator, reactor starter and the like. The choice depends upon the rating, type of load and frequency of starting of the motor to be used. In consideration of the smooth acceleration, availability of automatic control and other performance features, the reactor type of starter has hitherto been most often used.

The reactor starter, on the other hand, has the disadvantage that it requires a costly reactor shorting switch equivalent to a power switch, said shorting switch causing sparks when starting or switching the motor which will result in damaged contacts. This will reduce the service life of the starter particularly if it is used ever so often. Indeed, this poses a serious problem with starters of this type which now find more use in large current, high voltage circuits.

It is an object of the present invention to provide a new reactor starter for an AC motor of this character which will obviate the necessity of such a reactor shorting switch and which will hence substantially eliminate the wear of contacts in high voltage, large current circuits.

It is another object of the invention to provide an improved reactor starter for an AC motor of this character which is capable, in the absence of conventional reactor shorting switches, of suppressing the inrush current by a voltage drop provided by the reactor and thus switching the motor to full-voltage operation.

It is a further object of the invention to provide an improved reactor starter of this character which requires less copper material than heretofore required for the conventional reactor starters, thereby rendering the starter construction more compact and low-priced.

It is still another object of the invention to provide an improved starter of this character which will eliminate the sparks which would otherwise develop upon switching the starter, thereby saving considerable starting torque.

It is still another object of the invention to provide an improved starter of this character which will accomplish the aforesaid objects and which is further characterized by the provision of a simple automatic control.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 diagrammatically illustrates a single-phase circuit or one-phase portion of a three-phase circuit of a starter for an AC motor embodying the present invention;

Figure 5:
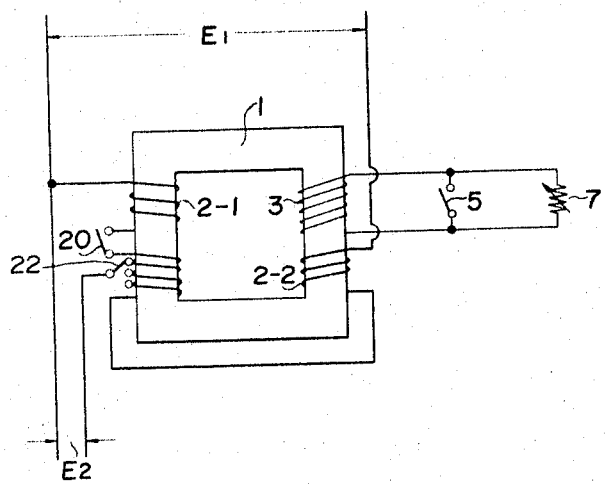
Figure 6:
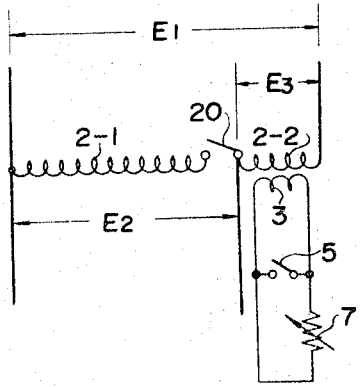
Figure 7:
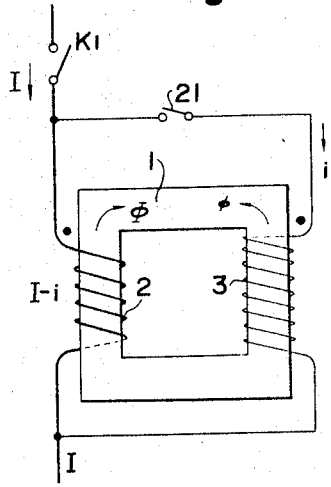
Figure 8:
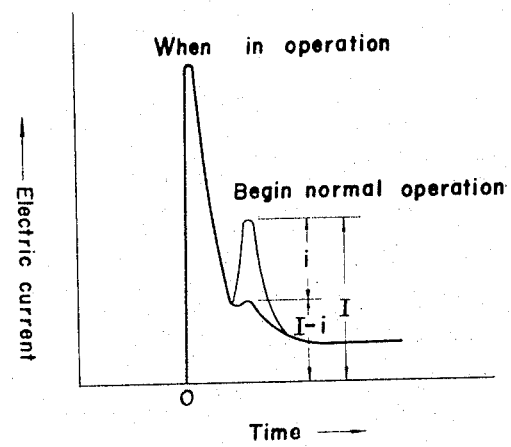

FIG. 5 diagrammatically illustrates a single-phase circuit or one-phase portion of a three-phase circuit of another AC motor starter embodying the invention;

FIG. 6 is a circuit layout of the starter circuit of FIG. 5;

FIG. 7 diagrammatically illustrates a single-phase circuit or one-phase portion of a three-phase circuit of still another AC motor starter embodying the invention, and FIG. 8 graphically illustrates the current characteristic of the starter of FIG. 7 when in operation.

Figure 1:
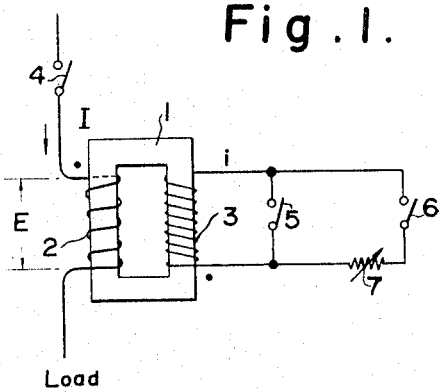

Reference to FIG. 1 shows a magnetic circuit formed by a laminated core 1 or the like which has wound thereon a primary winding 2 for the main circuit and a secondary winding 3 for circuit compensation. Designated at 4 is a switch and at 5 and 6 respectively are switches adapted to act upon the circuit of the compensating secondary winding 3, said switch circuit 6 being provided with a variable resistor or variable reactance 7. The secondary winding 3 has ampere turns inverse to but preferably equivalent to those of the primary winding 2.

With this construction, the starter of FIG. 1 may be switched into operation by throwing in the main switch 4 with the secondary winding switches 5 and 6 held in open position, so that a voltage drop may be provided by the self-reactance of the primary winding 2 for suppressing the inrush current from flowing into the load. The switch 5 may be closed when the main circuit current I through the primary winding 2 has attenuated to a predetermined value, thereby causing the primary winding and the secondary winding to cancel each other out because of their oppositely formed ampere turns. If, in this instance, the two ampere turns are equivalent, the laminated core 1 produces no flux and hence, remains as a non-inductance circuit thereby permitting the starter to achieve normal operation upon removal of the voltage drop in the main circuit.

Further with this construction, the secondary current $i$ through the secondary winding 3 may be adjusted by regulating the variable resistor or variable reactance 7 with the switch 5 held in the open position and the switch 6 in a closed position. Consequently, the value of inverse ampere turns of the secondary winding 3 may be properly adjusted thereby to control the starting inrush current through the main circuit.

This will further permit the starting torque to be controlled while starting the motor easily by adjusting the variable resistor or variable reactance, and this can be accomplished without damage to the contacts which would otherwise result from sparks generated upon switching of the taps as in the case of a conventional device.

Figure 2:
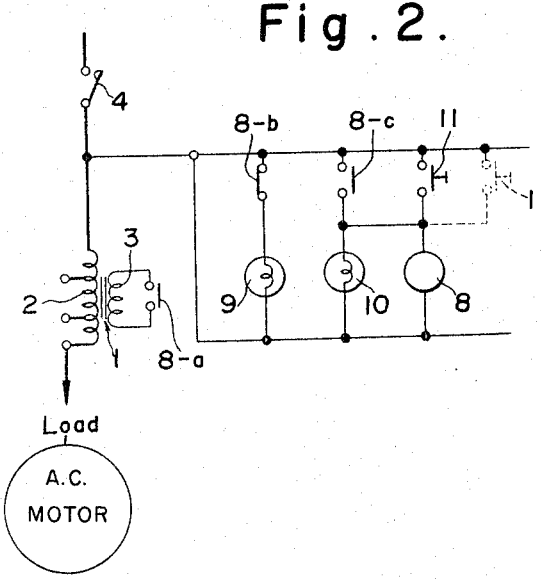
FIG. 2 is a circuit diagram exclusively illustrating the details of the single-phase circuit or the one-phase portion of the three-phase circuit of the starter of FIG. 1.
Figure 3:
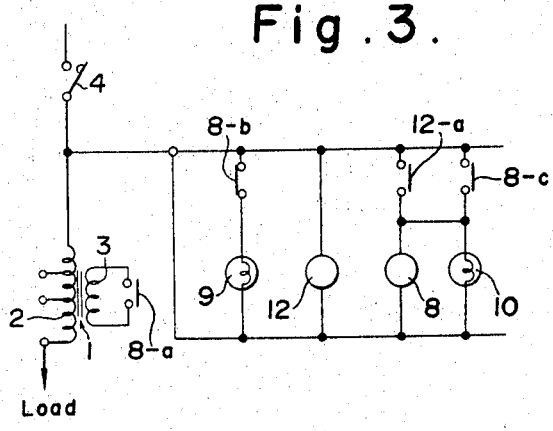
FIG. 3 is a circuit diagram illustrating a modification of the single-phase circuit or the one-phase portion of the three-phase circuit of the starter of FIG. 1.
Figure 4:
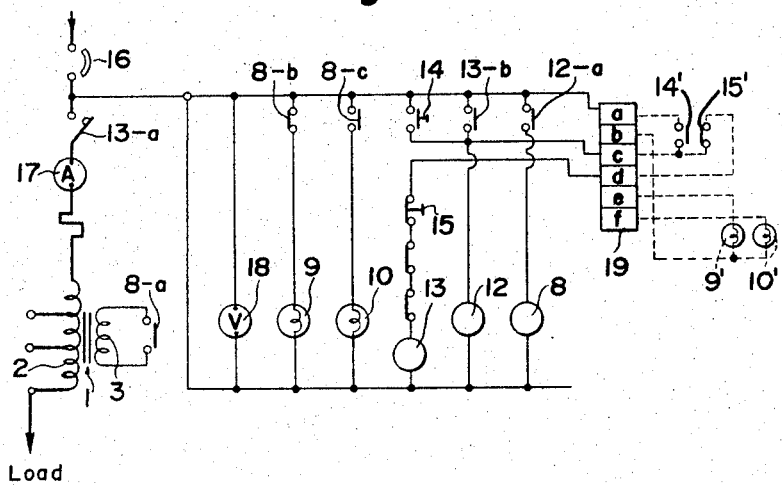
FIG. 4 is a circuit diagram exclusively illustrating another modification of the single-phase circuit or the one-phase portion of the three-phase circuit of the starter of FIG. 1.

FIGS. 2 to 4, inclusive, are utilized to show the internal circuit concept of FIG. 1 as applied to a practical starter, all illustrating either the single-phase circuit or the one-phase portion of the three-phase circuit.

In FIG. 2, designated similarly at 1 is an iron core; at 2 is a primary winding for a main circuit which is a tapped winding; at 3 is a compensating secondary winding and at 4 is a main switch. Further provided at 8 is an electro-magnetic switch comprising a main contact strip 8–a and a pair of auxiliary contact strips 8–b and 8–c, the main contact strip 8–a being a switch for the secondary winding 3 while the auxiliary contact strips 8–b and 8–c are respectively a normally closed switch for a green lamp 9 and a normally open switch for a red lamp 10. The contact strip 8–c is further connected with the electro-magnetic switch circuit 8 and is thus utilized as a self-retaining contact for the electro-magnetic switch 8.

With this circuit arrangement, the green lamp 9 is caused to light by throwing in the main switch 4 and the starter is placed in operation while suppressing the starting inrush current with the self-reactance of the primary winding 2. After ascertaining a rise in the speed of the motor, the push-button 11 may be switched thereby to energize the electro-magnetic switch 8 and close the contact strips 8–a and 8–c while opening the contact strip 8–b. Closing the contact strip 8–a closes the circuit of the secondary winding 3 of which inverse ampere turns tending to remove the voltage drop caused by the primary winding 2. Simultaneously, the green lamp 9 turns off followed by the lighting of the red lamp 10 indicating the start of normal operation, while the electro-magnetic switch 8 is held in the closed position.

Designated by the dotted line in FIG. 2 is a remote control circuit whose push-button switch 11′ may be located a suitable distance away from the starter, for instance at a place near the power switch.

The modification of the starter circuit shown in FIG. 3 according to the invention is intended to perform the actuation of the secondary winding by means of a time relay after the main switch has been thrown in. Connected with the power circuit is a time relay 12 having a contact strip 12–a adapted to act upon the circuit of the electro-magnetic switch 8.

With this circuit construction, the main switch 4 is set in the closed position for placing the starter circuit in operation. Upon lapse of a time determined by the time relay, the contact strip 12–a causes the electro-magnetic switch 8 to close thereby changing the switches 8–a, 8–b and 8–c to begin normal operation. This simple arrangement helps eliminate any circuit manipulation subsequent to the throwing of the main switch. With this starter circuit arrangement embodying the invention, it will be appreciated that in the event of power failure, the electro-magnetic switch circuit 8 immediately opens thereby to resume normal operation of the entire system and when the power is turned back on, the circuit may be automatically and safely put back into normal operation in the manner already described.

Thus, the starter according to the invention may be used for starting the motor with utmost safety even at nights and without attendance by the operator.

The embodiment of the invention diagrammatically shown in FIG. 4 includes a main switch which may be electro-magnetically controlled and which may be mounted in a starter box combined with the time relay. The main switch comprises a main contact strip 13–a which may be closed upon actuation of a main electro-magnetic switch 13. The main electro-magnetic switch circuit has connected thereto a turn-on push-button switch 14 and a cut-off push-button switch 15, and its auxiliary contact strip 13–b is inserted into the circuit of the time relay 12 in a manner similar to the arrangement of FIG. 3.

Designated in FIG. 4 by the reference numeral 16 is a no-fuse breaker; at 17 is an ammeter; at 18 is a voltmeter, and at 19 is a terminal board mounted in the starter box and having secured thereto a plurality of individual terminals a–f, each of said terminals being connected, if required, to on-off push-button switches 14′ and 15′ for remote control, a green lamp 9′ and a red lamp 10′, respectively.

When remote control operation is not required, the terminals c–d may be short-circuited and the push-button switch 14 is depressed thereby to actuate the main electro-magnetic switch 13 and the time relay 12.

The modification shown in FIGS. 5 and 6 of the starter circuit of FIG. 1 includes a primary winding bisected into parts 2–1 and 2–2 and a switch 20 interposed therebetween. The laminated core 1 having wound thereon said primary winding is further provided with a secondary winding 3 which is equivalent to and has inverse ampere turns to either part of said primary winding, for instance the part 2–2. Connected to the circuit of the secondary winding 3 are a switch 5 and a variable resistor 7. Switch 22 can select one of a plurality of taps on the winding 2–1.

In the starter circuitry of FIGS. 5 and 6 just described, the switch 20 is closed for starting the motor, so that the primary windings 2–1 and 2–2 are connected in series to act as a single-winding transformer for producing a voltage drop required to control the inrush current. As the main circuit current declines to a predetermined value, the switch 20 is opened and the switch 5 closed so that the voltage drop $E_3$ provided by the primary winding 2–2 will be compensated for by the secondary winding 3.

Consequently, the load terminal voltage grows to $E_1$ at which the starter switches into full-voltage operation. In such instance, the function of the secondary winding 3 is also to compensate for the voltage drop caused by the primary winding 2–2. It follows that the amount of copper material required for the starter construction in this modified embodiment of the invention is less than that required for the embodiment illustrated in FIG. 1.

Both switches 20 and 5 can be operated either by a time relay or electro-magnetic switch similar to the circuit arrangements illustrated in FIGS. 2–4. It should be noted, however, that excitation currents flow through the switch 20 but no load is imposed thereon, so that there will be no sparks generated as in the case with conventional reactor starters.

The starter circuitry embodying the invention schematically illustrated in FIG. 7 is suitable for low voltage applications, say for example, up to about 400 volts. This starter circuit arrangement includes a laminated core 1 having wound thereon a primary winding 2 and a secondary winding 3. The secondary winding 3 is coupled to the primary winding 2 in such manner that the former produces magnetic flux $\phi$ in a direction inverse to and hence to cancel the magnetic flux $\Phi$ from the latter but permits the flow of current $i$ which is in the same direction as the main current I. The secondary winding 3 may be further provided with a switch 21 which opens on starting and closes when the main circuit current has attenuated to a predetermined value, the operation of said switch 21 being manual or automatic whichever is more feasible. Where automatic operation of this switch is preferred, there may be advantageously used a slow-acting relay or time relay in any known manner and similar to the case of FIG. 3 or FIG. 4.

In the embodiment of FIG. 7, the switch 21 may be held open, when the primary winding 2 gives by its self-reactance a desired voltage drop whereby to suppress the inrush current against the load. The switch 21 may be closed as soon as the main circuit current has attenuated to a predetermined value, whereupon the magnetic flux $\Phi$ of the primary winding 2 and the magnetic flux $\phi$ of the secondary winding 3 tend to cancel each other out thereby rendering the circuit non-inductive.

This may be explained by the formula:

$$(I-i)T_1 = iT_2$$

where $T_1$ denotes the number of turns of the primary winding and $T_2$ denotes the number of turns of the secondary winding, and where the ampere turns of the primary winding are equivalent to the inverse ampere turns of the secondary winding. Thus, it will be obvious that the core 1 generates no flux, hence the circuit is held non-inductive. Consequently, upon removal of the voltage drop provided by the reactor circuit, it is possible to place the starter in full-voltage operation.

FIG. 8 graphically displays the value of currents flowing through the operating switches of the starter construction embodying the invention as compared to those with the case of a conventional type of starter.

From the above graphical illustration, it will be understood that because the conventional reactor starter is switched into operation with the main circuit winding shorted, the increasing current at the time of switching flows directly to the contacts, whereas with the starter according to the invention the relatively small current $i$ alone flows through the switch 21, this current being represented by $$i = I \times \frac{T_1}{T_1 + T_2}$$

Therefore, should $T_1 = T_2$ be so, it follows that $i = \frac{1}{2}$.

Now, considering the wear of contacts as $Ki^2$ (K is a constant determined by the material of contact and associated requirements), it will be obvious that the life of contacts may be increased four times over that of the prior art device even in the case of $i = \frac{1}{2}$ and may be further increased by changing the ratio of $T_1$ to $T_2$.

In the starter arrangements herein above discussed which implement the present invention, the primary and the secondary winding are both advantageously utilized in starting the motor. This means that the coil diameter required may be considerably reduced thereby to facilitate the handling of the core when compared to conventional thick wire coils and that the amount of copper required may be held to a minimum. All such benefits provided by the invention will eventually render the starter structurally light and compact.

Since certain changes and modifications may be made in the above described circuit construction and different embodiments may be made of the invention without departing from the spirit or scope thereof, it is intended that all the matter contained in the above description and shown in the accompanying drawings shall be considered as illustrative and not in a limiting sense.

What is claimed is:

1. A starter circuit for an AC motor, comprising essentially of a core for forming a magnetic path, a main circuit winding on said core for controlling the inrush of current to the motor on starting, a compensating winding circuit having a winding on said core and having the turns wound so as to produce a flux in the core opposed to the flux of the main current winding, switching means in said compensating winding circuit for keeping the compensating winding circuit open on starting the motor so that the self-reactance of the main circuit winding suppresses the inrush of current and for closing the compensating winding circuit so that said compensating winding circuit generates a flux in the magnetic circuit of the core opposing and substantially cancelling the flux generated by the main winding circuit.

2. A starter circuit as claimed in claim 1 in which said main circuit winding is a tapped winding, the number of turns in said compensating winding circuit winding producing a number of ampere turns when said compensating circuit is closed by said switching means which is equal to the number of ampere turns produced by the untapped portion of the main winding.

3. A starter circuit as claimed in claim 1 in which said compensating winding circuit is independent of said main circuit and has a variable impedance therein for adjusting to the voltage and current of the main circuit.

4. A starter circuit as claimed in claim 1 in which said compensating winding circuit is a shunt circuit connected in parallel with said main circuit.

5. A starter circuit as claimed in claim 4 in which the number of turns in said compensating winding circuit winding produces a number of ampere turns when said compensating winding circuit is closed by said switching means which is equal to the number of ampere turns produced by the main winding.

6. A starter circuit as claimed in claim 1 in which said switching means is an electro-magnetic switch having self-holding means.

7. A starter circuit as claimed in claim 1 in which said switching means is an electro-magnetic switch having a main contact for closing said compensating winding circuit and an auxiliary contact, said switching means further having a self-holding circuit having a pilot lamp therein, said auxiliary contact closing said self-holding circuit.

8. A starting circuit as claimed in claim 1 in which said switching means comprises an electro-magnetic switch, a time delay relay means for closing said electro-magnetic switch, and a main switch for energizing said time delay relay.

9. A starting circuit as claimed in claim 8 in which said main switch is an electro-magnetically operated switch having push-button actuating means.

10. A starting circuit as claimed in claim 1 and further including a remote control terminal board coupled to said starting circuit for effecting remote control operation of the starting circuit.

References Cited

UNITED STATES PATENTS

| | | | |
|---|---|---|---|
| 2,247,073 | 6/1941 | Thompson | 318—229 |
| 2,894,191 | 7/1957 | Charbonneaux | 318—229 |
| 1,696,177 | 12/1928 | Evans | 323—85 X |
| 2,030,470 | 2/1936 | Russell | 318—419 X |
| 2,047,228 | 7/1936 | Rypinski | 318—419 X |
| 2,299,911 | 10/1942 | Logan | 318—419 X |

JOHN F. COUCH, *Primary Examiner.*

WARREN E. RAY, *Examiner.*